(12) United States Patent
Rohrer

(10) Patent No.: US 8,614,520 B2
(45) Date of Patent: Dec. 24, 2013

(54) SUBMERGABLE SLOPED ABSORPTION BARRIER WAVE ENERGY CONVERTER

(75) Inventor: John Rohrer, York, ME (US)

(73) Assignee: Rohrer Technologies, Inc., York, MN (US)

( * ) Notice: Subject to any disclaimer, the term of this patent is extended or adjusted under 35 U.S.C. 154(b) by 38 days.

(21) Appl. No.: 13/506,680

(22) Filed: May 8, 2012

(65) Prior Publication Data

US 2013/0113211 A1    May 9, 2013

Related U.S. Application Data

(60) Provisional application No. 61/628,732, filed on Nov. 5, 2011.

(51) Int. Cl.
| *F03B 13/10* | (2006.01) |
| *F03B 13/12* | (2006.01) |
| *H02P 9/04* | (2006.01) |
| *F03B 13/18* | (2006.01) |

(52) U.S. Cl.
USPC .................................. 290/42; 290/53; 60/497

(58) Field of Classification Search
USPC .......................................... 290/42, 53; 60/497
See application file for complete search history.

(56) References Cited

U.S. PATENT DOCUMENTS

| 1,061,091 | A | * | 5/1913 | Lewis | 60/506 |
| 1,887,316 | A | * | 11/1932 | Lockfaw | 417/330 |
| 3,644,052 | A | * | 2/1972 | Lininger | 415/7 |
| 3,687,567 | A | * | 8/1972 | Lininger | 415/7 |
| 4,170,738 | A | * | 10/1979 | Smith | 290/42 |
| 4,230,421 | A | * | 10/1980 | Springett et al. | 405/168.3 |
| 4,269,540 | A | * | 5/1981 | Uyeda et al. | 405/168.3 |
| 4,340,322 | A | * | 7/1982 | Springett et al. | 405/168.3 |
| 4,345,855 | A | * | 8/1982 | Uyeda et al. | 405/168.3 |
| 4,379,235 | A | * | 4/1983 | Trepl, II | 290/53 |
| 4,384,456 | A | * | 5/1983 | Boros | 60/499 |
| 4,392,060 | A | * | 7/1983 | Ivy | 290/53 |
| 4,490,621 | A | * | 12/1984 | Watabe et al. | 290/42 |

(Continued)

FOREIGN PATENT DOCUMENTS

| WO | WO 2010/078940 | 7/2010 |
| WO | WO 2011/062576 | 5/2011 |
| WO | WO 2011/067124 | 6/2011 |

OTHER PUBLICATIONS

Lin, Chia-Po, Experimental Studies of the Hydrodynamic Characteristics of a Sloped Wave Energy Device, 1999, The University of Edinburgh, Edinburgh, Scotland.

*Primary Examiner* — Pedro J Cuevas
(74) *Attorney, Agent, or Firm* — Mark D. Lorusso

(57) ABSTRACT

An ocean wave energy converter uses one or more buoyant elongated float(s) self orienting toward oncoming wave fronts and movably affixed to a motion stabilized controlled buoyancy frame by down sloping tracks constraining the wave induced motion of the float(s) to an upward and rearward motion as oncoming wave crests impact and lift the barrier(s) and downward and forward as subsequent wave troughs return it. Motion between the barrier(s) and the frame is resisted and energy captured by a programmable electric or hydraulic power take off system. Capture efficiency is further enhanced by adjusting float mass and buoyancy by controlling water entering or exiting cavities in the float(s), use of wave shoaling and focusing means, and adjusting the submerged depth and slope angle of the device with adjustable frame air-water ballast tanks which also allow total float submergence during severe sea states.

28 Claims, 9 Drawing Sheets

(56) References Cited

U.S. PATENT DOCUMENTS

| | | | |
|---|---|---|---|
| 4,599,858 A * | 7/1986 | La Stella et al. | 60/497 |
| 4,625,124 A * | 11/1986 | Ching-An | 290/42 |
| 4,672,222 A * | 6/1987 | Ames | 290/53 |
| 5,052,902 A * | 10/1991 | Labrador | 417/330 |
| 5,094,595 A * | 3/1992 | Labrador | 417/332 |
| 5,405,250 A | 4/1995 | Vowles et al. | 417/329 |
| 5,854,516 A * | 12/1998 | Shim | 290/53 |
| 5,921,082 A * | 7/1999 | Berling | 60/325 |
| 5,929,531 A * | 7/1999 | Lagno | 290/53 |
| 6,109,029 A * | 8/2000 | Vowles et al. | 60/398 |
| 6,184,590 B1 * | 2/2001 | Lopez | 290/53 |
| 6,956,300 B2 * | 10/2005 | Gizara | 290/43 |
| 7,023,104 B2 * | 4/2006 | Kobashikawa et al. | 290/42 |
| 7,131,269 B2 * | 11/2006 | Koivusaari | 60/495 |
| 7,476,137 B2 | 1/2009 | Stewart et al. | 441/1 |
| 7,476,986 B1 * | 1/2009 | Del Principe | 290/53 |
| 7,536,859 B2 * | 5/2009 | Tai et al. | 60/497 |
| 7,554,215 B1 * | 6/2009 | Caragine | 290/42 |
| 7,737,568 B2 | 6/2010 | Vowles et al. | 290/42 |
| 7,768,144 B2 * | 8/2010 | North et al. | 290/53 |
| 7,785,163 B2 | 8/2010 | Spencer et al. | 441/1 |
| 7,878,734 B2 | 2/2011 | Bull et al. | 405/76 |
| 7,909,536 B2 | 3/2011 | Dick | 405/76 |
| 8,080,893 B2 * | 12/2011 | Lin | 290/53 |
| 8,093,736 B2 | 1/2012 | Raftery | 290/42 |
| 8,110,937 B2 * | 2/2012 | Finnigan | 290/53 |
| 8,123,579 B2 | 2/2012 | Gerber | 441/1 |
| 8,264,095 B2 * | 9/2012 | Camp | 290/53 |
| 8,334,611 B2 * | 12/2012 | Shreider et al. | 290/53 |
| 2006/0028026 A1 * | 2/2006 | Yim | 290/53 |
| 2008/0016863 A1 * | 1/2008 | Tai et al. | 60/497 |
| 2012/0032446 A1 * | 2/2012 | Rohrer | 290/53 |
| 2013/0031897 A1 * | 2/2013 | Hagemann et al. | 60/505 |
| 2013/0104537 A1 * | 5/2013 | Dib Echeverria | 60/498 |

* cited by examiner

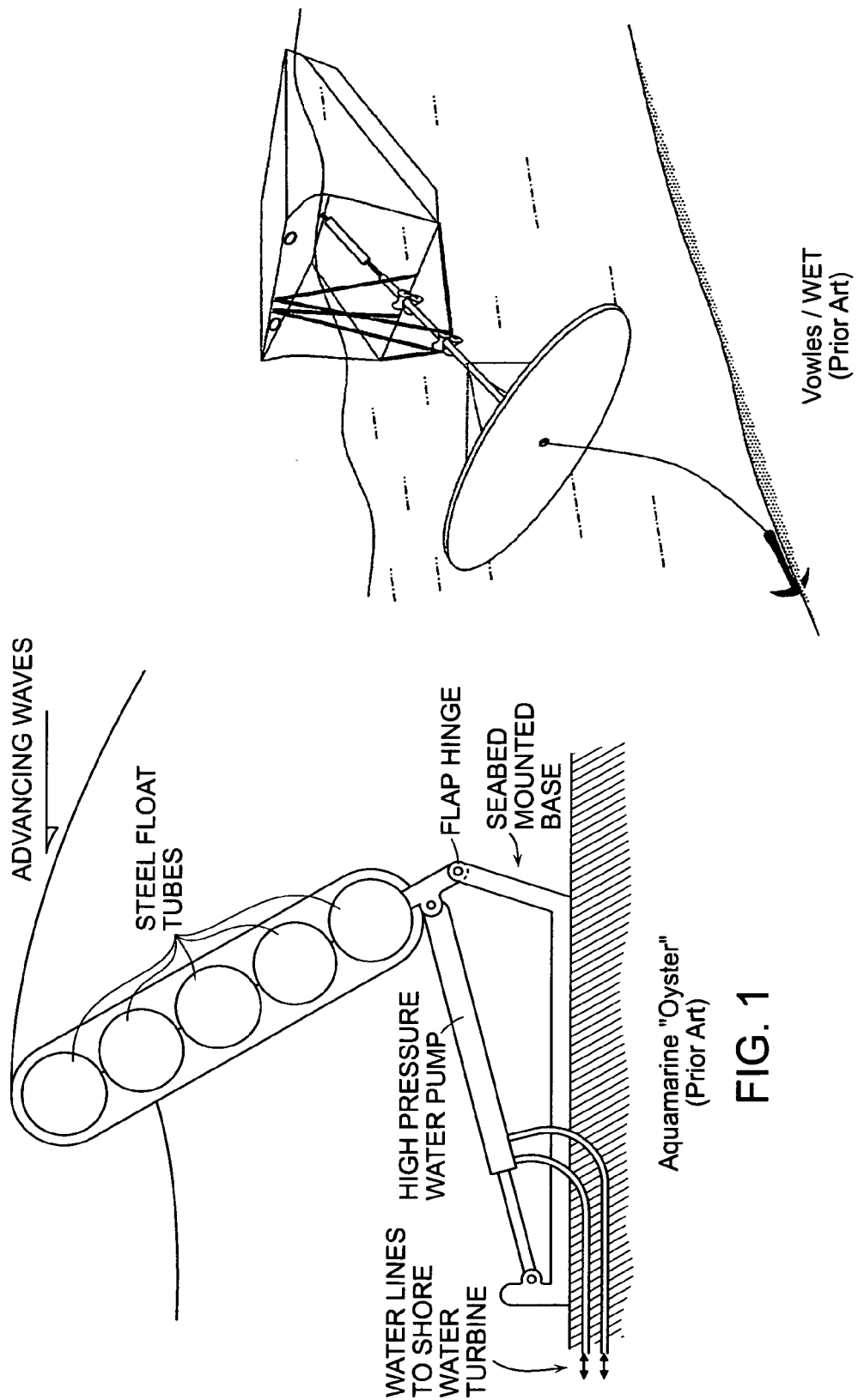

Sloped IPS Buoy — Fixed Position

Sloped IPS Buoy — Free Floating

SUBMERGABLE SLOPED ABSORPTION BARRIER WAVE ENERGY CONVERTER

RELATED U.S. APPLICATION DATA

Provisional Application No. 61/628,732 filed on Nov. 5, 2011, U.S. application Ser. No. 13/199,607 filed on Sep. 2, 2011, and prior applications of which Ser. No. 13/199,603 is a Continuation-In-Part.

FIELD OF THE INVENTION

This invention relates to devices for producing electrical power, pressurized water or other useful work from surface waves on a water body.

More particularly, this invention relates to wave energy converters of the wave terminator or barrier type wherein one or more elongated wave energy absorbing floating bodies or barriers are oriented approximately parallel to oncoming wave fronts or swells. The subject invention relates to "sloped" barriers or terminators which, unlike more common vertical "heave only" buoys, are concurrently displaced both vertically upwardly and rearwardly (relative to the oncoming wave direction) by oncoming waves and subsequently both downwardly and forwardly, opposite the direction of oncoming waves, during subsequent oncoming wave troughs. Such elongated floating body(s), therefore, move in a sloped path which path, reacting against the mass of a sloped spar or tube or track to capture portions of both wave heave (potential vertical) and surge (kinetic lateral) energy. Heave and surge wave energy each comprising exactly half of total wave energy in deep water.

BACKGROUND OF THE INVENTION

Commercialization of Ocean Wave Energy Converters (OWECs) lags significantly behind solar and wind energy even though ocean wave energy is significantly more concentrated, predictable and persistent than the solar energy which produced the winds or the wind energy that produced the ocean waves and swells. Water's high density (over 800 times higher than air) accounts for this high energy density but also increases the challenges of severe sea-state survivability for OWECs. Over 100 OWEC designs have been proposed over the last century yet only a handful of proto-types have only recently been ocean deployed at "commercial scale" (over 150 kw electrical output). No utility scale (over 1 MVV) OWECs have yet been ocean deployed. To make such OWECs survivable in typical 15 meter severe storm waves, most currently proposed OWECs are made of heavy steel plate (like ocean going ships which can survive 15 meter waves). This makes the OWECs both expensive and unresponsive (inefficient) during more normal sea-states. Most OWECs have at least one floating component which moves in response to oncoming waves (i.e., a flop-gate or buoy or float or raft) which is flexibly attached to a second moving or relatively stationary component (a seabed or seawall attachment or a comparable or more massive floating component). As oncoming waves move one component relative to another, a resistive force mechanism absorbs energy (resistive force×distance=energy or work captured).

The "IDEAL OWEC" would be light weight (for high wave responsiveness in all sea conditions), low cost, with high energy capture efficiency in most sea-states, and yet be survivable in severe sea states. It would be deployable in deep water where wave energy levels are highest and potential conflicts with fishing, boating and shoreline visual impacts are minimized. It would be elongated (in the direction parallel to oncoming wave fronts), rather than circular in section, thus intercepting the most wave front energy per unit of OWEC width, area, volume and, therefore, have lower cost/unit width. Circular section and other narrow width buoys, must square their sectional area and cube their volume (exponentially increasing cost) to intercept or access the energy from additional oncoming wave front. Because exactly half of all deep water wave energy is "potential" or "heave" energy (mass of water between the vertical distance between each crest and trough) with the remaining half "kinetic" energy (from the mass of water particle movement), an efficient OWEC must capture most of both wave energy components (or be very inexpensive).

Vertically heaving buoys, can only capture the heave or potential energy component which can never exceed 50% of total wave energy. Near shore deployed floating, bottom pivoting "flap" or "pivoting" or "hinged" gate type OWECs can only capture the kinetic or "surge" energy component of near shore waves which have already lost to bottom friction a major portion of the energy they contained in deep water. Another necessity to high wave energy capture efficiency is to match the wave resistive force of the OWEC to oncoming waves. If the device is too "stiff" or resistive, it will reflect much or most of the impacting wave, partially or totally canceling succeeding oncoming waves, rather than absorbing the wave's energy. If the device's resistive force is too weak, the wave will pass over, under, or through the OWEC rather than being absorbed by it. Because few succeeding waves are alike, an ideal efficient device must sense each successive wave's potential energy and vary the device's resistive force with each wave (or at least adjust to the average wave amplitude and frequency for that time period). If the motion of an OWEC itself produces its own waves, those waves carry away energy not absorbed by the OWEC, and potentially cancel or reduce the energy of oncoming waves. OWECs which have their mass and buoyancy "tuned" to a specific amplitude and period for optimum performance ("resonance" dependent OWECs) with uniform wave produced in a wave test tank have dismal performance in real ocean wave conditions having random amplitudes and periods.

DESCRIPTION OF THE PRESENT INVENTION

According to embodiments of the present invention, one or more adjacent buoyant bodies, individually or collectively forming an elongated buoyant wave absorbing float or barrier, is oriented or self orienting such that said elongated float or barrier is approximately parallel to oncoming or prevailing wave fronts. Said elongated barrier(s) generally have a horizontal wave front facing width greater the vertical height or horizontal depth of said barrier(s), excluding any extension plates or attachments thereto. Said elongated floating barrier(s) is movably attached via tracks, slides, lever arms or other mechanical means, to a relatively stabilized or stationary second floating adjustable or controlled buoyancy frame or mount (in contrast to the non-buoyant sloped spars or tubes of the prior art) in such manner that the wave induced motion of said first floating body(s) or barrier(s) is mechanically limited to or constrained to sloped motion relative to said frame and the water surface moving concurrently upwardly and rearwardly, relative to oncoming wave fronts, with each oncoming wave crest and subsequently downwardly and forwardly with each subsequent oncoming wave trough.

The shape, buoyancy, and sloped movements of said buoyant first body(s) is such that little or no energy absorbing back wave is produced. The approaching wave crest induced upward and rearward sloped movement of said elongated buoyant barrier(s) and in some embodiments the subsequent wave trough induced downward and forward sloped movement along said same slope angle is resisted by an energy absorbing power take off (PTO) means, connected between said first floating elongated float(s) or barrier(s) and said relatively stationary secondary floating frame or mount. The controllable buoyancy of said frame allows the submerged depth, mass and buoyancy of both the frame and the movably attached float(s) or barrier(s) to be adjusted to varying sea conditions to optimize or maximize wave energy capture and also allows total submergence of said barrier(s) for protection or survival during severe sea states. This "submerge to survive" capability is unique within the OWEC prior art and allows the floats or barriers of the present invention to be made of light weight, responsive, inexpensive materials such as rigid foam filled fiber reinforced plastics.

In various embodiments of the present invention, said resistive force is applied by the PTO using either a rotary electrical generator using a rack and pinion or helical drive, a linear electrical generator, a low pressure or high pressure hydraulic or pneumatic turbine/motor generator system, with or without a constant output accumulator tank, or by other fluid pumping or mechanical generation means. In some preferred embodiments, this electrical, hydraulic, or pneumatic resistive PTO force can be varied and computer controlled or programmed to match the sensed size and speed of individual or average oncoming waves to optimize or maximize wave energy capture efficiency.

Such mechanically constrained attachment of said first elongated buoyant barrier(s) to said second relatively fixed or stabilized floating frame or mount in various embodiments can be by one or more linear or arculate low friction slide or roller tracks attached to said frame with either a fixed or adjustable slope angle, preferably down sloping toward oncoming waves between 15 and 65 degrees from horizontal. Alternatively, one or more relatively long lower frame attached pivoting or lever arms (relative to average wave height) can provide said constrained sloping relative movement of said first elongated buoyant barrier(s).

In all embodiments of the present invention, a relative stationary or stabilized second floating adjustable buoyancy mount or frame is provided. Said frame may have one or more hollow tubes, pipes, or columns, the upper portions of which may protrude above the water surface and may also provide surface maintenance access to the PTO and other power conditioning, drives, and controls which may be located within water tight air filled upper portions of said frame members. Said frame also has attached said sloped motion constraining means, with integral or affixed tracks, slides, or lever arms constraining the sloped motion of said first elongated buoyant barrier(s). The buoyancy and hence the submerged depth of these buoyant columns or frame members can be adjusted or controlled by use of air blown water ballast tanks located in the lower portions of said frame members, such that the submerged depth and/or the slope angle of the OWEC of the present invention can be adjusted to maximize wave energy capture efficiency or to totally submerge said first buoyant floating body(s) for survival during severe sea states.

In most embodiments of the present invention, the moving mass and buoyancy of said elongated buoyant float(s) or barrier(s) is also variable or adjustable by utilizing sea water ballast. The increased ballast mass of said elongated buoyant barrier(s) can provide added gravity return force to both return said barrier(s) to its former wave trough position and to do work (recover energy) by the downward and forward return travel of said barrier(s). The amount of return force provided (or required) is also dependent on the constrained slope angle of travel between said first and second bodies. If said buoyant first barrier(s) is too massive, its responsiveness to oncoming waves is reduced. If its mass is too light, it may not provide enough return force for significant energy capture during its downward/forward return stroke and may not complete said downward return stroke. It is, therefore, desirable to have the mass of said elongated first barrier(s) variable, being heavier in heavy sea states and lighter in lighter sea states or alternatively gaining mass during upstrokes and losing mass near the bottom of down strokes.

This can be done by having an upward facing concave cavity molded or fabricated into the top surface of said elongated buoyant barrier(s). Large oncoming waves will overtop the wave front facing forward surface of said barrier(s) at least partially filling said cavity with water thus raising mass. Water drain vent holes in the bottom of this cavity will allow this water to drain during the ensuing down stroke lowering its mass so it will be more responsive to the next significant wave. Alternatively or additionally, the size or opening and closing of said vent holes can be controlled during each wave cycle such as by using a cam surface on said fixed frame engaging a roller cam follower on the wave front face of said barrier(s) opening said vents when desired. Alternatively, a wave actuated spring loaded hinged or pivoting front panel can serve as the wave impacting front face of said cavity (see FIG. 9).

In most embodiments of the present invention, a fixed position wave focusing or "shoaling plane" or plate is attached to said second buoyant body or frame in front of the concave wave front facing surface of said elongated first buoyant barrier(s) at approximately the same downward sloping angle as the glide or roller tracks, to increase wave amplitude and the surge or impacting force on said float(s). Optional upright converging vertical side walls can further enhance these wave focusing effects. Said concave front wall on said float(s) can also have an extended lower surface at said downward slope angle to further increase wave amplitude and impacting force, especially if said fixed position wave focusing plane or plate is not utilized.

Distinguishing Features Over the Prior Art

The present invention is clearly distinguished from relevant prior art, being the only OWEC having both an elongated float(s) or barrier(s) constrained to downward sloping motion (relative to oncoming waves), to capture both heave and surge wave energy components, and a stabilized controlled buoyancy frame allowing both submerged depth and slope angle adjustment for optimized or maximized wave energy capture efficiency as well as total float or barrier submergence for severe sea OWEC survival (unique "Submerge to Survive" capability).

Additional distinguishing features of various embodiments include adjustable (water ballast) buoyancy or mass of said elongated surface float(s) or barrier(s) controlled by said controlled buoyancy frame. This allows the controllable buoyancy controllable depth frame to also control the mass and buoyancy of the barrier by changing its submerged height allowing water to fill or drain from the float's internal cavities. This allows optimization of the float's mass and submergence level for optimum wave energy capture efficiency. It also allows the controlled buoyancy frame to totally submerge the float(s) during severe sea states without the need for an extreme mass of high density ballast. Additional distinguishing features include wave focusing and/or shoaling plane means to further enhance the capture efficiency, survivability, and frame hydraulic stability of the subject invention.

Prior Art FIG. 1 shows a near shore only deployable, seabed mounted, bottom hinged vertical buoyant "flap gate" type OWEC utilizing a pressurized water PTO system called the "Oyster" currently being developed by Aquamarine. "Flap" or "hinged gate" type OWECs capture only the "surge" wave energy component (not heave) of total wave energy, which energy is substantially reduced as waves near shore. Flap gates, unlike the present invention, also produce a significant "back wave" which further reduces the energy otherwise capturable. Flap gates, by their geometry, have excessive resistive force but little travel distance near their bottom hinge, but insufficient resistance near the top or surface where wave kinetic energy is greatest. Their lower hinge or pivot point constrains gate movement of their buoyant body (gate) to an arculate path rather than the down sloping path of the present invention. They are typically deployed in shallow water (under 20 meters) where a substantial portion of heave energy has been changed to surge, but much of the deep water wave energy has been lost to bottom friction. They do not use floating frames, like the present invention, to self adjust for tides.

Gerber U.S. Pat. No. 8,123,579 and Dick U.S. Pat. No. 7,909,536 which are being commercially developed as the OPT "Power Buoy" and "Wavebob" respectively, are good examples of "point source absorbers", not elongated or sloped absorption barriers like the present invention. They are vertical "heave only" OWECs catching no surge wave energy component. Neither Dick '536 nor Gerber '579 describe or claim sloped motion between their circular section (not elongated) surface ring or "donut" shaped float and their motion stabilized center spar or frame. Both prior art OWECs rely on vertical heaving "resonance" for acceptable capture efficiency and both produce substantial efficiency reducing back waves, unlike the present invention. Dick '536 can "de-tune" (reduce capture efficiency) by reducing center spar or frame stabilizing ballast and raising the spar during heavy seas (allowing it to rise and move with the float) by reducing spar water ballast. The present invention increases frame water ballast during heavy seas producing partial or full submergence (by using a different water ballasting means than Dick '536).

Prior Art FIG. 3 and FIG. 4 show wave tank test scale models and proposed full scale models, respectively, of the "Sloped IPS Buoy" proposed and tested by the University of Edinburgh from 1995 to 1999 by Salter and Lin. When the non-buoyant sloped slide or track of the FIG. 3 device was rigidly fixed to the wave tank bottom (unlike the stabilized buoyant frame of the present invention) it showed reasonably good capture efficiencies for constant amplitude and period waves after the mass of the float was optimized or "tuned" for a specific wave period and amplitude using metal rod weights. Simulated random waves reduced collection efficiencies by about 40%. These results indicate/verify that the device was highly dependent upon "tuned" resonance (like a child's swing) for good capture efficiency. Resonance is only possible with uniform frequency and amplitude laboratory produced waves. Real sea waves have random amplitudes and frequencies. When the scale model wave tank tests were attempted with a "free floating" Sloped IPS Buoy using a water filled "inertia tube" for stabilization, similar to their proposed commercial design of Prior Art FIG. 4, performance was disappointing, even with uniform period and amplitude artificial "lab produced" waves and their concept was subsequently abandoned. This poor free floating random wave performance was most likely due to:

1. The non-buoyant frame of the "free floating" Sloped IPS Buoy having insufficient stabilization mass and pitching resistance due to the relatively small, open water ballasted, "inertial draft tube" with water piston. The adjustable ballast floating frame with deep water drag plates of the present invention has well over 10 times the effective stabilization mass per unit width of intercepted wave front than this "Sloped IPS Buoy".

2. The high moving mass and buoyance of the IPS Buoy works well when they are "resonance tuned" to a very specific constant frequency and amplitude wave in the lab, but not in real random wave seas. The low and variable/adjustable moving mass elongated buoyant barrier(s) of the present invention (with optional lower mass on upstroke and higher mass on down stroke) is not "resonance dependent". The wave to wave sensed computer controlled variable resistance PTO of embodiments of the present invention further reduces the need for "resonance dependence" for high energy capture efficiency.

Vowles U.S. Pat. No. 7,737,568 (Prior Art FIG. 2), which is very similar to the Prior Art sloped IPS Buoy of FIGS. 3 and 4 (which preceded it by several years) also describes a buoyant float which is also constrained to a downward sloping movement, for combined "heave" and "surge" wave energy capture, also using a non-buoyant spar or frame or "driven linkage", unlike the buoyant and controlled buoyancy frame of the present invention. Vowles '568 was apparently unaware of the extensive prior sloped IPS Buoy work done at the University of Edinburgh first disclosed at the 1995 Lisbon Conference. (Cited reference 2, October 1998 paper by Salter & Lin). Vowles '568 describes both a non-buoyant seabed affixed spar (in his FIG. 16) and a non-buoyant slack moored spar with drag plate (in his FIG. 15).

Neither the sloped IPS Buoy (Saulter & Lin) nor Vowles '568 describe or claim the "second buoyant body or frame" of the present invention. Without the buoyant and controlled buoyancy frame of the present invention, maintaining a constant slope angle, adjusting that angle for optimized energy capture, and adjusting the OWEC's submerged depth for optimized or maximized energy capture efficiency or severe sea state total submergence and survival is not possible. The floating frame of the present invention also drastically improves frame heave, surge and pitch stability, essential to acceptable capture efficiency. If only the moving float (not the non-buoyant spar or frame) is providing all the buoyancy for the OWEC, effective frame stabilization, even with '568's drag plate, is unlikely and control or adjustment of slope angle and submerged depth is, of course, impossible.

Both Vowles and the Sloped IPS Buoy lack the ability to vary the buoyancy and mass of the elongated floating barrier(s) with water ballast via the means used in embodiments of the present invention which uses the adjustable depth frame and/or the PTO resistive force to change mass of the slope constrained float(s) allowing sea water to enter or drain from the water storage cavity(s) in the float(s) or barrier(s) thereby changing their mass. Vowles and the Sloped IPS Buoy also lack any means, and more particularly the means of certain embodiments of the present invention, to quickly shed excess float mass when severe wave impacts dictate. The present invention utilizes either an open top cavity and sloping rear wall (FIGS. 5, 7, 8, 9, 10, 11) and/or a spring loaded hinged wave impacting face (FIG. 9) and/or a spring loaded bottom hinged float vessel tipping means (FIGS. 10 and 11) to shed float water ballast upon excessive wave impact and/or sudden deceleration of said floats rearward travel.

BRIEF DESCRIPTION OF THE DRAWINGS

FIG. 1 is a semi-submerged side/end isometric view of the Prior Art "Oyster" near-shore, seabed deployed, vertical, buoyant "flap gate" type OWEC being commercialized by Aquamarine of Belfast (N. Ireland) and Inverness Scotland.

FIG. 2 is a Prior Art semi-submerged isometric view of Vowles '568 assigned to Wave Energy Technologies of Winnipeg, Canada.

DESCRIPTION OF PREFERRED EMBODIMENTS

The features and limitations of the Prior Art OWECs of FIG. 1 through FIG. 4, inclusive, are previously described and discussed in the previous Distinguishing Features over Prior Art section.

Figure 3:
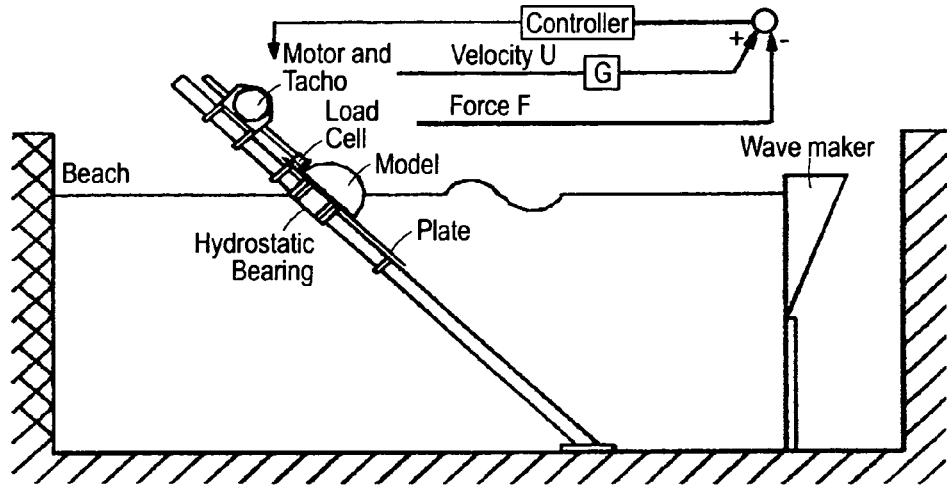
FIG. 3 is a Prior Art semi-submerged side elevation view of the "Sloped IPS Buoy" with rigid mount as tested at the University of Edinburgh, Scotland in 1998.
Figure 4:
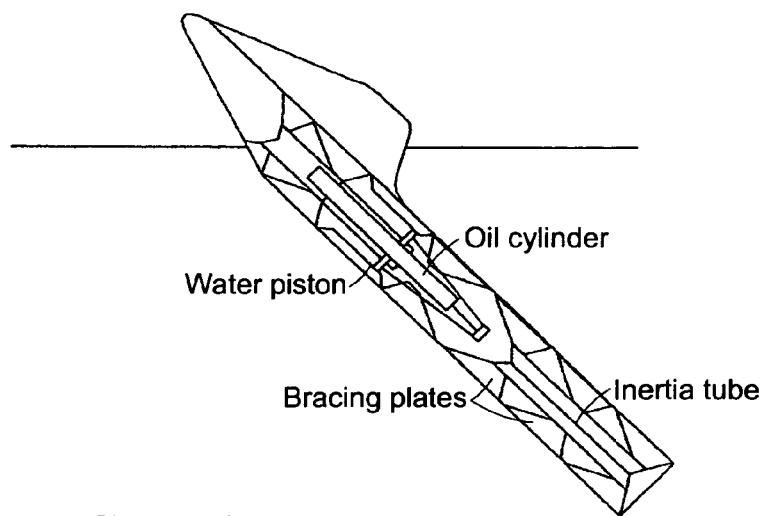
FIG. 4 is a Prior Art semi-submerged side elevation view of a proposed commercial design free floating "Sloped IPS Buoy" similar to the "free floating" scale model tested at the University of Edinburgh in 1998.
Figure 5:
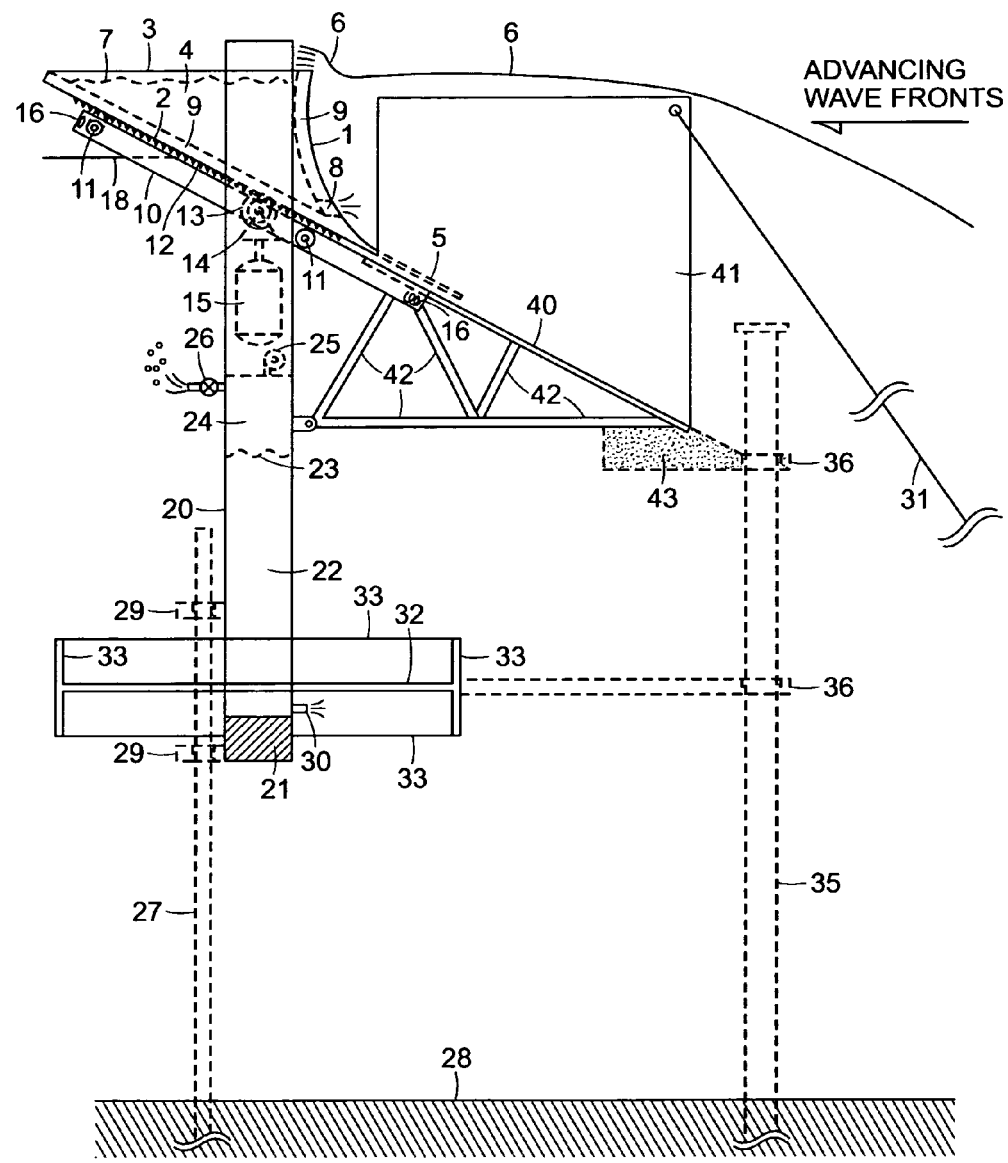
FIG. 5 is a semi-submerged side elevation view of an embodiment of the present invention with said elongated buoyant barrier(s), having an open top cavity for variable water mass, with its motion constrained with roller tracks, on its buoyancy adjustable frame, to a relatively linear down sloping path, relative to advancing wave fronts.

FIG. 5 describes an embodiment of the present invention wherein one or more relatively lightweight floating elongated buoyant float(s) or barrier(s) 9 having a wave front facing and impacting front wall 1 which may be buoyant or non-buoyant, concave (shown), flat and slope upwardly and outwardly only (per FIGS. 9 and 11) or convex (not shown), rigid (shown) or a hinged panel (per FIG. 9 or 11) or a flexible wave impacting front wall (not shown), and a relatively flat and upward and rearward sloped bottom wall 2. Said floating barrier(s) 9 can have an open top cavity (shown) or be solid or hollow (not shown). Said elongated barrier 9, or multiples of said barriers 9, arranged side-by-side, will have a horizontal width, aligned approximately parallel to oncoming wave fronts, substantially greater than the horizontal front to rear depth 3 of said barrier, excluding extension plate 5 or other appendages. The top 3 of said floating body or barrier 9 can be concave and open (shown), hollow with fill and drain holes (not shown) creating an open vessel interior volume 4, or enclosed and hollow or foam or solid filled (not shown). An optional extension plate 5 may protrude from the lower front of front wall 1 at approximately the same angle as sloped bottom wall 2 and sloped frame track 10. Said vessel can be fabricated of metal or composites or foam and composites. It is advantageous to have the empty float or vessel 9 mass relatively low such that it is buoyant and floating in response to oncoming waves.

The movement of said elongated buoyant float or barrier 9 is mechanically constrained by downward sloping track(s) 10 capturing wheels 11 affixed to the bottom 2 or sides of said barrier(s) 9. Said tracks 10 are rigidly affixed to substantially vertical adjustable buoyancy mounting column(s) 20 either at a fixed or adjustable downward sloped angle, preferably between 15 and 65 degrees from horizontal. Said floating elongated barrier(s) are constrained to said downward and upward sloping motion, rather than to a substantially vertical heaving motion (like a heaving buoy), as this allows the capture of both heave and kinetic wave energy components and provides more time and travel or stroking distance to make such wave energy capture.

Alternative low friction sloped motion constraining means can be used including linear or hydrostatic bearings, slides or the like (not shown). Said sloped constraining means can be linear (shown) or curvilinear (per FIG. 6). Both ends of said track(s) are equipped with springs 16 or other mechanical or hydraulic end stop cushioning devices to prevent severe end stop shocks from large waves. Such shocks are also reduced or eliminated by: a) increasing the resistive load of the onboard generator 15 or other PTO system and/or; b) by allowing some pitching motion in the mounting frame 10 with attached vertical frame column(s) 20, in the direction of oncoming waves during wave crests and rebounding toward wave fronts during wave troughs; and c) allowing water 7 in said top cavity 4 to slide out of said cavity if and when said barrier is rapidly decelerated towards the end of its upstroke.

Impacting wave crests 6 raise said buoyant float(s) or vessel 9 upward and rearward producing a "power stroke" using both vertical (heave) buoyant forces and wave impacting lateral (surge) forces, over-topping said front wall 1 if and when waves are of sufficient size, the adjustable buoyancy frame is sufficiently submerged, and/or when said generator 15 or other PTO provides sufficient resistive force, prior to completing said stroke and partially or completely filling barrier(s) 9 cavity interior 4 to water level 7 thus increasing its mass prior to starting its movement downward and forward (toward oncoming wave fronts) as wave crest 6 starts to withdraw. The water surface 18 behind said elongated barrier(s) 9 remains relatively quiet. Such increased buoyant barrier(s) mass allows the down or return stroke to be faster, more powerful and/or provide a second downward "power stroke". When said wave crest 6 is subsequently replaced by a wave trough, some or all of said water 7 in said elongated barrier(s) interior cavity 4 can be exited through drain ports 8 in said front wall 1 thus reducing the mass of said barrier(s) 9, making it more responsive to the next oncoming wave. Rather than relying only on gravity to drain said cavity 4, said vents 8 can have mechanical means such as gates or doors (not shown) actuated by cam lobes on the top of said tracks 10 (cams not shown) which facilitate the timely discharge of said barrier(s) contained water. Concave barrier's 9 mass can also be adjusted or controlled by utilizing the compressed air 25 seawater ballast system in frame columns 20 to adjust said frame's depth (and the depth of tracks 10) allowing cavity 4 to fill through drain ports 8 and or supplemental sidewall ports (like 57 in FIG. 11).

The movements of said vessel(s) 9 along said track(s) 10 or other motion constrictive means are resisted by a PTO means such as, but not limited to, the gear rack 12 affixed to said vessel bottom 2 driving pinion 13 through bevel gears 14 to an electrical generator 15. Alternative PTO means (not shown) include linear electric generators or hydraulic cylinders or rotary pumps driving hydraulic motor-generators using a pressurized hydraulic fluid accumulator tank to allow constant speed synchronous power generation. Another alternative generating means (not shown) utilizes high pressure pneumatic pumps to produce compressed air stored in short duration on-board accumulator tanks for on-board synchronous power generation or at substantial water depths in large or multiple elastic variable volume containers for longer term compressed air storage for use during peak electrical demand periods. If necessary, the PTO means or other motive force (such as springs or weights) can assist gravity in timely returning said elongated buoyant barrier 9 on its downward and forward return stroke during approaching wave troughs. Said PTO resistive force can also be controlled during each wave cycle to match the previously sensed frequency and amplitude of each oncoming wave. Said PTO resistive force in combination with frame submerged depth control, can also produce overtopping and filling of said cavity(s) in the top of said float(s).

Elongated buoyant float(s) or barrier(s) 9 constraining tracks 10 are mounted on a relatively stationary stabilized floating frame comprising one or more floating buoyant frame column(s) 20 shown or other frame member a portion of which protrude above the still water surface. It is advantageous to have a floating rather than a fixed depth rigid frame to prevent the adverse performance impact of tidal water level changes on wave energy capture efficiencies, to adjust submerged depth and track 10 slope angle for optimum energy capture, and to provide total float 9 submergence for severe sea state survivability. Said floating vertical buoyancy column(s) 20 or similar frame members have a lower section 21 extending into relatively deep undisturbed water. This lowest section 21 may contain a high density ballast material such as metal or concrete with a hollow frame section 22 containing or comprising a tank 22 which may be totally or partially filled with sea water ballast to adjustable level 23. Floating column(s) 20 may be raised or lowered by alternatively discharging water 23 or air 24, supplied by air compressor 25 out of air discharge valve 26 or water vent 30. Said floating vertical column(s) 20 may be optionally attached to one or more rigid seabed fixed poles or piling(s) 27 or 35 with vertical sliding mounts or bushings 29 or 36 respectively, which slidable mounts eliminate any pitching or horizontal movement of said frame 20, or, alternatively, with a seabed 28 affixed mooring line(s) 31. Rigid seabed affixed piling 35 or 27 can alternatively be attached to or replaced by the tower or a platform member of a floating or seabed affixed off-shore wind turbine or oil or gas production platform. To eliminate or reduce any vertical wave induced heaving motion in said mounting column(s) 20 and rigidly attached track(s) 10, one or more stabilization drag planes or plates 32 are attached to the bottom extended section 21 of said columns 20. Said planes 32 may have extended vertical edges 33 around their perimeter to entrap more water mass, further preventing upward and downward heaving. Alternatively, if one or more optional rigid seabed affixed pilings 27 or 35 are used, slide mounts 29 or 36, respectively, can be made to be slow reacting allowing slow tidal vertical movements, but not the 5-25 second typical wave or swell period induced movements. The entire OWEC can be partially or fully submerged to avoid damage from severe sea states by the use of the variable ballast tank(s) 22 and compressed air system 25 and 26.

The wave energy capture efficiency of the OWEC of the present invention may be further enhanced by the optional addition of a planar (shown) or curvilinear (shown in FIG. 6 element 54) wave shoaling or focusing plate or plane 40 preceding said elongated floating wave absorption barrier(s) frontal surface 1 and down sloping at approximately the same angle as said barrier(s) 9 rearward surface 2 and constraining track 10. Said plate 40 may have vertical and converging (forward to rearward) or parallel (to one another) side plates or shields 41 to further focus oncoming waves and increase their height or impact velocity as they approach and impact said floating barrier(s) forward surface 1. Said wave focusing plate 40, with optional side walls, 41 is supported and rigidly attached to vertical floatation column(s) 20 and/or barrier(s) vessel track(s) 10 via support frame 42. Wave focusing plane 40 also provides stabilization against wave induced heaving or pitching of said frame with vertical mounting column(s) 20 increasing the "effective" or "virtual" mass of said frame by the mass of water adjacent to and resisting the movement of "shoaling plane" 40. Such wave shoaling planes are commonly used on "overtopping" type OWECs and many Oscillating Water Column (OWC) type OWECs to capture some surge energy component. To the extent to which the weight of plate 40 and its frame 42 move the center of gravity forward of its center of buoyancy, causing it to list forward, buoyant material 43 may be attached to or be part or all of said plate 40.

It is desirable to have the OWEC of the present invention always naturally point towards oncoming wave fronts rather than permanently fixing its orientation towards the direction of prevailing waves. This can be done by having mooring line(s) 31 converge to a single pivoting point on or above its seabed attachment point. The wave induced resistive force on the subject OWEC will keep wave impacting surface 1 relatively parallel to oncoming wave fronts if it is behind said pivot point (as per FIG. 8 element 79). Alternatively, a single floating vertical mounting column 20 can be used, optionally mounted on a single seabed affixed rigid piling 27 or 35 with slide mounts 29 or 36 and said moving wave absorption barrier 9 and its motion constraining means 10 can be moved rearward (not shown) relative to said column 20 and piling 27 or 35 such that the wave induced resistive force is behind said column 20 and piling 27 or 35 pivot point. By attaching mooring line 31 to a relatively high and forward attachment point on said frame (or shoal plane side walls 41), said frame can be further stabilized against wave induced pitching or lateral movement.

Figure 6:
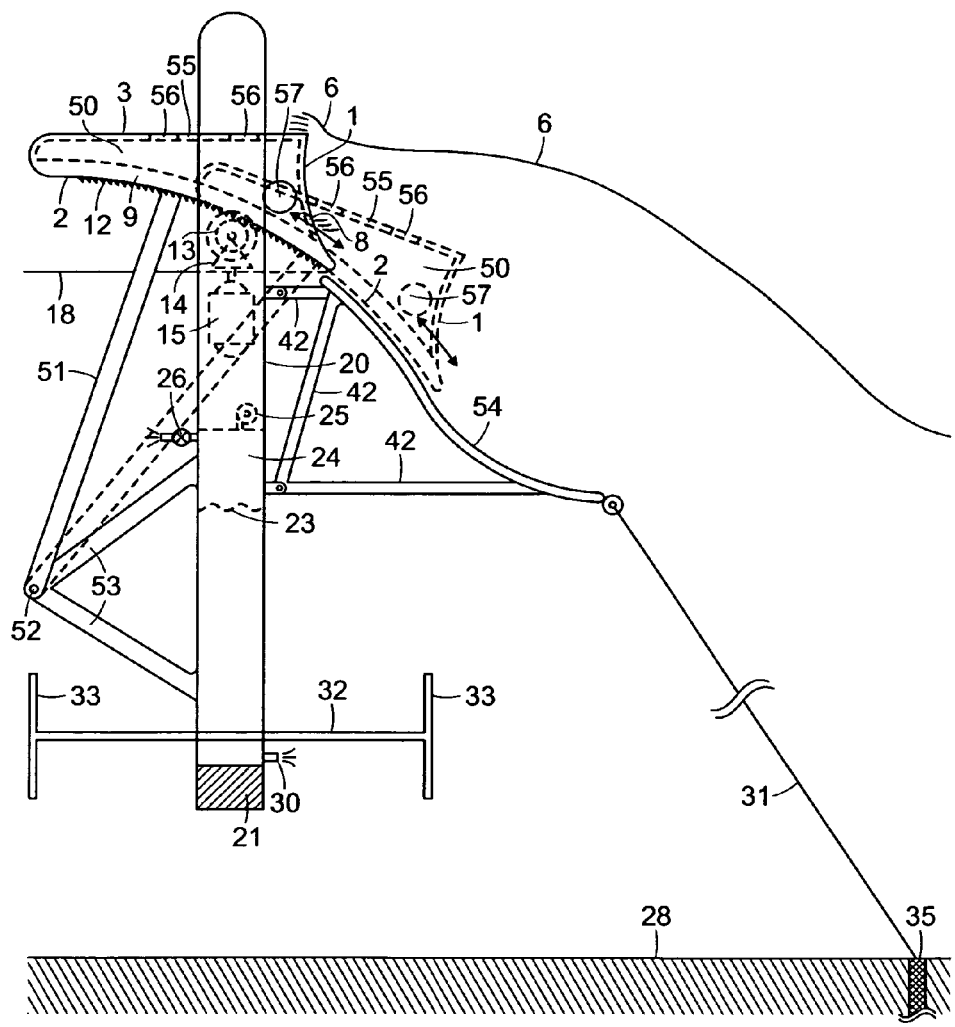
FIG. 6 is a semi-submerged side elevation view of an embodiment of the present invention, with said elongated buoyant barrier(s), with its motion constrained by lower frame mounted elongated lever or pivot arms to a down sloped arculate path.

FIG. 6 shows an embodiment of the present invention similar to FIG. 5 but showing one or more hollow 50 or light weight solid or foam filled (not shown) floating elongated wave absorbing barrier(s). Unlike FIG. 5, the cavity 50 in said hollow buoyant barrier has a top plate 55 which optionally can have ports or holes 56 allowing sea water to enter or drain from said cavity 50 increasing or decreasing said barriers mass and reducing its buoyancy. Said ports or holes 57 may also be in the sidewalls 3 of cavity 50. The front face 1 of said barrier(s) may also have drain vents 8 as in FIG. 5. Rather than having vessel motion constrained by the tracks 10 or similar means previously described, said floating barrier(s) 9 is constrained to an arculate down sloping motion by connecting arm(s) 51 moving about pivot point(s) 52 supported and affixed to floating vertical column(s) 20 by mounting strut(s) 53. An optional wave shoaling plane or plate 54 increases oncoming wave height and impact force on floating wave barrier(s) face 1 in similar fashion to plate 40 in FIG. 5. Said plate 54 may, optionally, have vertical side shields (not shown) per 41 in FIG. 5. The embodiment of FIG. 6 is tethered to the seabed 28 by mooring line 31 to single pivot point 35. Alternatively, it could pivot about the rigid bottom fixed piling 27 or 35 of FIG. 5. The dotted profile of said buoyant vessel 9 shows its forward extended position when a wave trough is oncoming or arrived.

Figure 7:
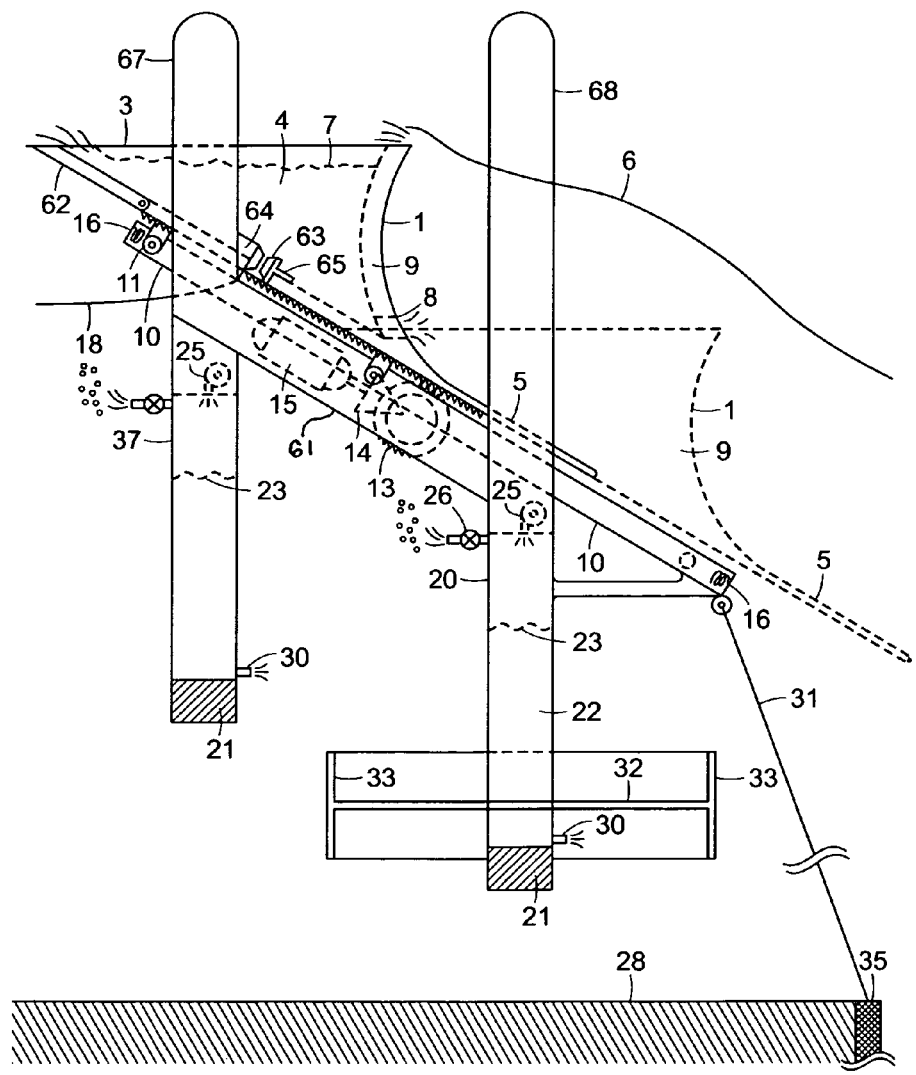
FIG. 7 is a semi-submerged side elevation view of an embodiment of the present invention, with said elongated buoyant barrier(s), having variable mass with its motion constrained with down sloping roller tracks mounted on a down sloping frame section attached to 4 vertical variable buoyancy, water ballasted, frame sections protruding above the water surface.

FIG. 7 shows an embodiment of the present invention similar to FIG. 5 wherein an elongated buoyant floating wave absorbing barrier 9 has its down sloping wave induced motion determined or constrained by one or more tracking means 10 within or affixed to a frame having multiple buoyant floating pipes or tubes or columns, said tubes having both a substantially sloped mid-section 61 between substantially vertical partially submerged sections 20, 21, 67, and 68. The variable depth air blown ballast system, rack and pinion to rotary generator or pump PTO system, and stabilization plate(s) 32 and 33 are as per FIG. 5. The elongated floating wave absorbing barrier 9 similar to FIG. 5 with forward wall 1, lower extension 5, and gravity flow or mechanically actuated water drain ports 8. The upper rearward end of said barrier 9 has a spring loaded gate section to release water from interior cavity 4 to reduce barrier 9 mass in the event that said barrier 9 is abruptly stopped by an unanticipated extreme wave induced up-stroking motion compressing end stop springs 16 and mating elastomer end stop pads 63 mounted 64 on both vertical frame 67 and the vessel 9 at mount 65. The dotted outline of vessel 9 shows its extended position when a wave trough is oncoming. Wave shoaling plane with side plates per FIG. 5 element 40 may also be used. Having both fore 22 and 68 and aft 37 and 67 upright adjustable ballasted frame members not only allows submerged depth control of the OWEC of the present invention for optimized energy capture efficiency and severe sea state survivability, but also allows control of the slope angle of frame member 61 and float constraining motion track 10 additional efficiency enhancement.

Figure 8A:
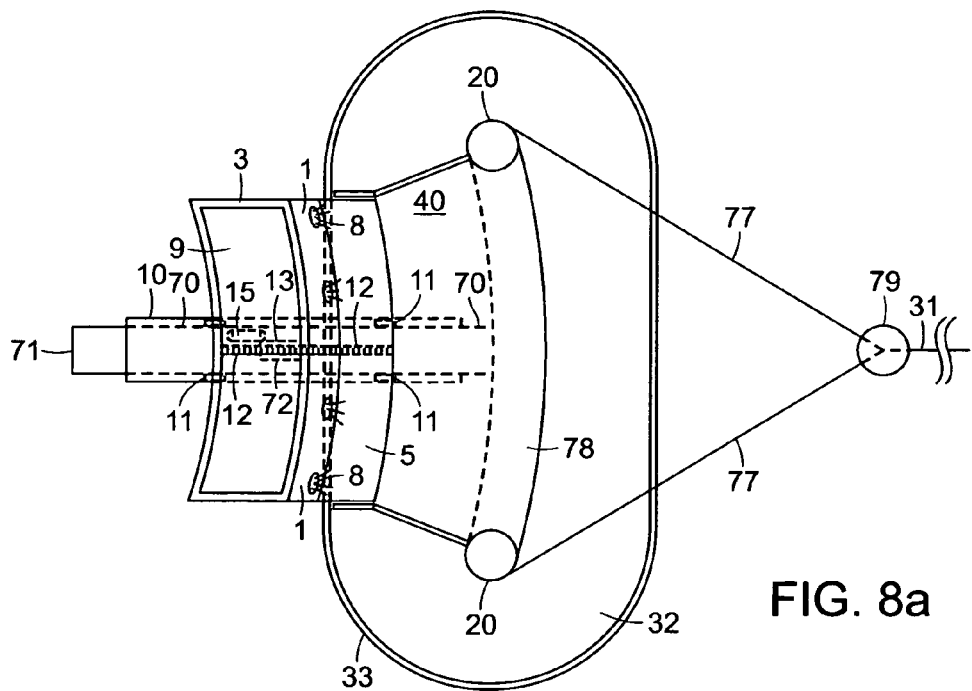
FIGS. 8a and 8b are plan and side elevation views, respectively, of an embodiment of the present invention with said elongated buoyant barrier being arculate and said sloped tracks being supported by a sloped frame member having three buoyant protrusions above the still water line.
Figure 8B:
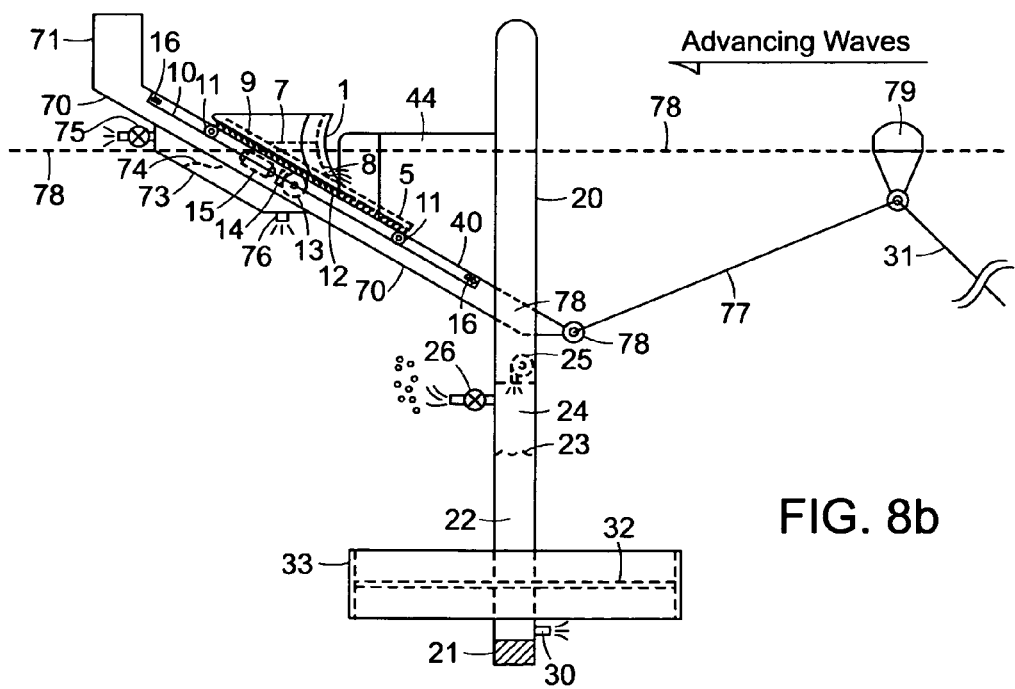

FIG. 8 shows an embodiment of the present invention similar to FIG. 5 wherein the sloped track 10 constraining said moving float(s) or barrier(s) 9 motion relative to said stabilized frame 20 is mounted on down sloping frame section 70 which is rigidly attached to frame cross member 78 which is itself rigidly attached to vertical frame members 20. The aft and higher end of frame member 70 is also rigidly attached to vertical frame member 71. The buoyancy of frame members 70 and 71 can be adjusted by the use of internal air blown water ballast tanks (not shown) or affixed external ballast tank 73 with water inlet/drain port 76 and valve controlled air exit port 75 and air water interface 74. Compressed air can be supplied to tank 73 via onboard compressor 25. Rack gear 12 transmits power absorbed by (attached) barrier 9 through pinion gear 13 and bevel gear 14 to generator 15. Pinion gear 13 is supported by frame 70 and located in cavity 72 within frame member 70. The FIG. 8 embodiment is self orienting toward oncoming wave fronts by having its tethering lines 77 pivoting about a single point mooring float 79 moored to the seabed by one or more mooring lines 31. Drag or reaction plate 32 and any other such frame stabilization plates in this or other embodiments can have hinged and spring loaded attachments to frame members 22, 20 or be flexible such that the severe impacts of extreme or unanticipated waves allow some frame movement thereby reducing the forces applied to said floats, PTO, and frame.

Figure 9:
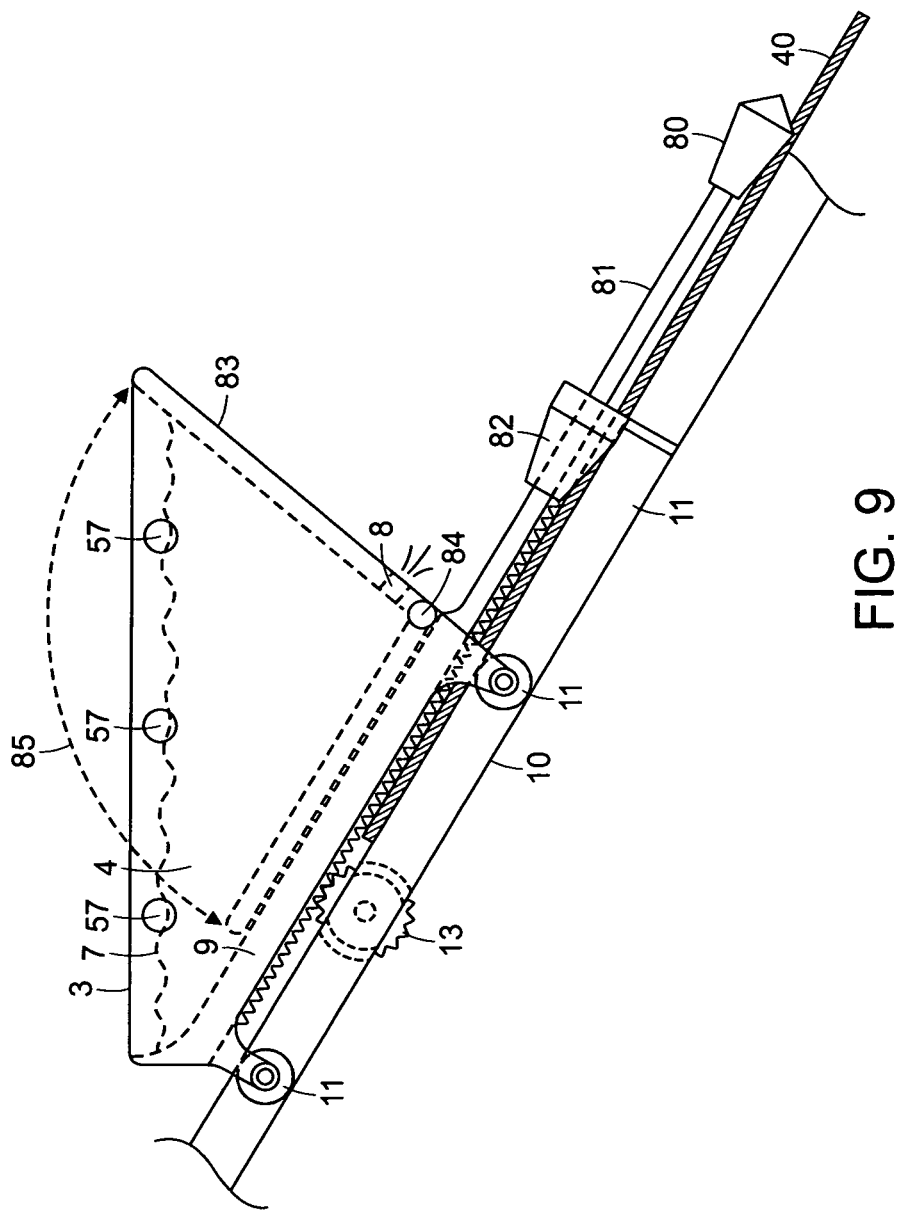
FIG. 9 is an elevation view of a section of an embodiment of the present invention similar to FIGS. 5, 7 and 8 showing a supplemental hydraulic end stop means for said barrier and a spring loaded deflectable forward wave impacting face.

FIG. 9 shows the mid frame section of an embodiment of the present invention similar to FIGS. 5, 7, and 8 wherein said buoyant float or barrier 9 is constrained to sloped movement by track 10 and wheels 11 driving a PTO system through gear rack 12 and pinion gear 13. Rather than, or in addition to, the spring end stops 16 of FIGS. 5, 7, and 8, or the elastomer pads 63 of FIG. 7, additional end stop protection is provided by hydraulic means including, but not limited to, the tapered submerged hydraulic plunger 80 of attached to moving barrier 9 by rod 81 which nests into submerged tapered hydraulic socket or cavity 82. Plunger 80 and mating socket 82 being so shaped as to produce increasing hydraulic resistance as plunger 80 travels into socket 82. The forward face 83 of the embodiment of FIG. 9 (like the embodiment of FIG. 11) differs from prior embodiments (and the Prior Art) having only an upward and forward section, the upper section of the stationary shoal plane 40 replacing the need for any lower forward face. The front face or wall 83 of buoyant barrier 9 also differs from previously described embodiments being return spring (not shown) loaded and hinged about point 84 such that unanticipated strong wave impacts will displace said front face 83 along arc 85 reducing said impact. Drain port 80 allows natural or mechanically actuated flooding and drainage of float 9 cavity 4 as previously described.

Figure 10A:
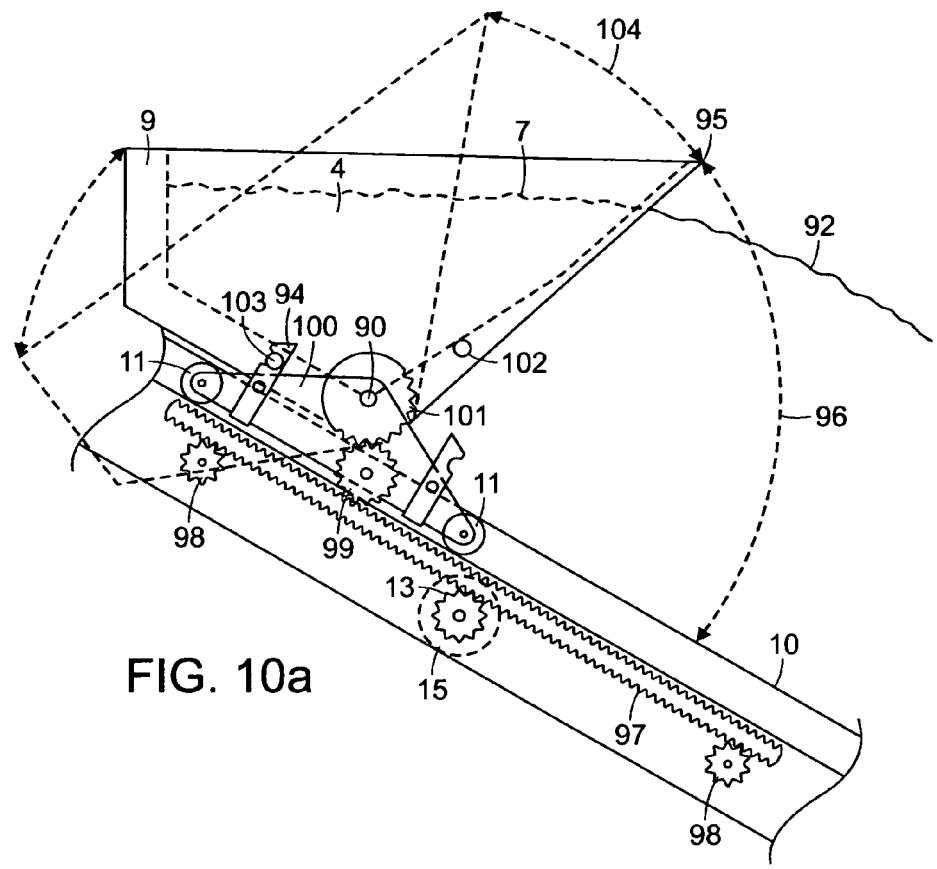
FIGS. 10a and 10b are side elevation views of a middle section of an embodiment similar to FIG. 7 or 8 wherein said buoyant barrier pivots such that its open cavity can face upward (as in FIGS. 7 and 8) or forward.
Figure 10B:
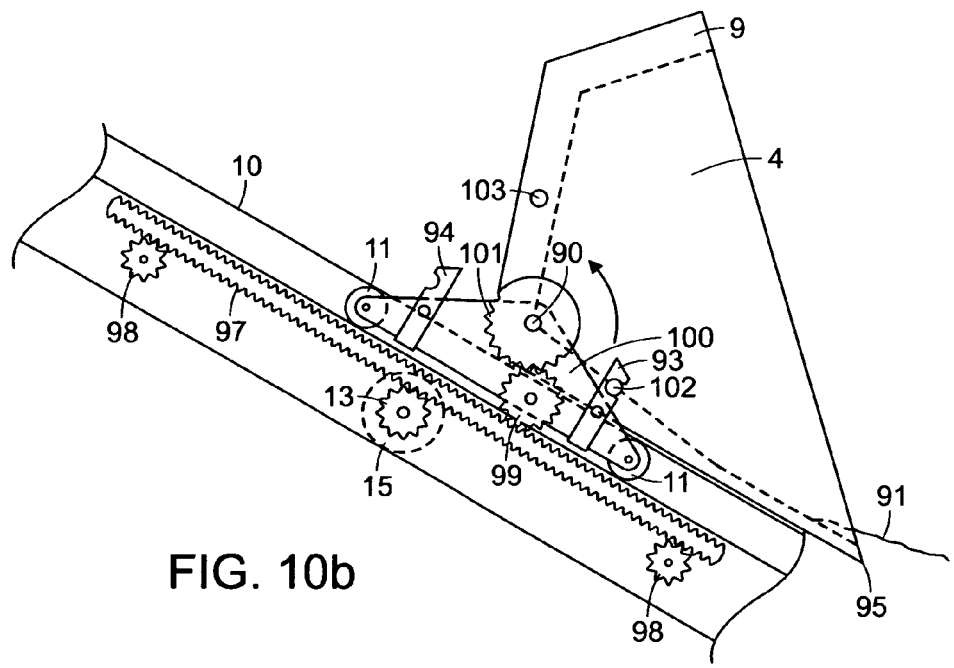

FIGS. 10a and 10b show an embodiment of the present invention similar to FIGS. 5, 7, and 8 wherein a concave buoyant float or barrier 9 with open top cavity moves in similar sloped manner being constrained by sloped track 10 and wheels 11. Said concave buoyant float 9 is also free of pivot about axel or pivot point 90 such that said concavity is facing toward oncoming wave troughs 91 and said concave barrier 9 rotates upward around pivot point 90 as oncoming waves 92 impact fill and lift said concave barrier up track 10. Said barrier's forward position (FIG. 10b) and/or upward position (FIG. 10a) can be controlled or maintained by forward 93 and rearward 94 latches which can be mechanically or electrically, released from forward 102 and rearward 103 pins by cams on or in track 10. The front lip 95 of said barrier which can have a forward extension plate (not shown in FIG. 10; element 5 in FIGS. 5, 7 and 8), thus rotates through arc 96. Geared rack 97, which drives generator 15 through pinion gear 13 is not affixed to said rotating barrier, but is retained by idler gears 98 and transfer gear 99 which is mounted on carriage 100, to which wheels 11 and pivot point 90 are also mounted, is driven by drive gear 101 rigidly affixed to said rotatable concave buoyant float about pivot point 90. Generator 15 is thus driven through rack gear 97, by both the sloped motion of said barrier and its rotation about pivot point 90. Capture of water mass 7 during oncoming wave or wave crest induced upstrokes increases barrier 9 mass and power capture on subsequent downstrokes while allowing low barrier 9 mass on initial upstrokes for faster response in light wave conditions.

Figure 11:
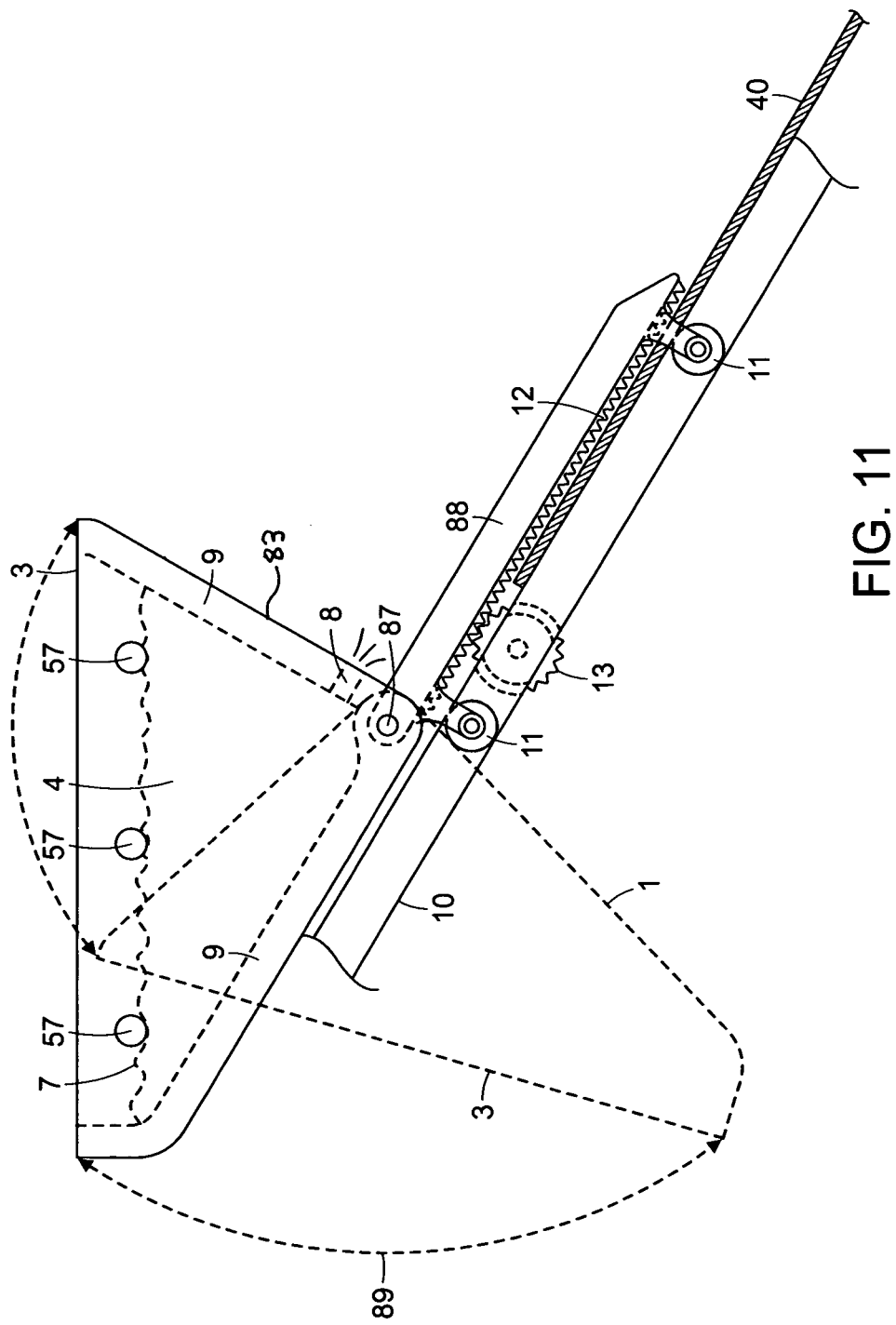
FIG. 11 is a side elevation view of a middle section of an embodiment similar to FIG. 5 or 7 wherein said buoyant barrier pivots rearward reducing the impact of unanticipated severe waves.

FIG. 11 shows the middle section of an embodiment of the present invention similar to FIGS. 5, 7, and 9 wherein said buoyant float or barrier 9 with open top cavity 4 pivots about spring loaded hinged joint 87 moving along arc 89 when impacted by unanticipated extremely large wave crests which would otherwise utilize the full available stroke causing said barrier 9 to severely impact end stop springs (16 in FIGS. 5 and 7), end stop pads (63 in FIG. 7) or other stroke end stop means (such as the hydraulic end stop shock absorber 80 and 82 in FIG. 9). Like FIGS. 5 and 7, said buoyant barrier 9 has an upward facing cavity 4 and an open top (similar to a boat hull) which can be partially or totally filled by overtopping wave crests and/or partial submergence of the adjustable buoyancy frame members (20 in FIGS. 5 and 20 and 37 in FIG. 7). Upon impact with severe wave crests resisted in part by forces from the PTO system applied to barrier 9 through rack 12 and pinion 13 PTO drive, the barrier 9 rotates counter clockwise about pivot point 87 along arc 89 (dotted outline of barrier) releasing any entrapped water 7 out of barrier's 9 open top 3, thus greatly reducing its moving mass. Hinged joint 87 has return springs (not shown) which return said barrier(s) 9 to its original operating position. Buoyant barrier 9 has optional side fill/drain holes 57. An optional lower wave impacting plate 88 carries barrier 9 constraining its motion through rollers 11 along sloped track 10. Alternatively, barrier 9 and pivot hinge 87 can be carried by a carriage without lower plate 88 with extended shoal plane 40, fixed to track frame member 10, replacing 88, as also shown in FIG. 9.

Alternative PTO means other than the rack of pinion rotary generator drive described herein may alternatively be used to transform captured heave and surge wave energy into electric power, pressurized water or other useful energy forms using the floating adjustable buoyancy frame and constrained downward sloping barrier described herein, without departing from the scope of the invention. Alternative PTOs compatible with the present invention include, but are not limited to, direct drive linear electric generators, high pressure hydraulic pistons or rotary pumps with short duration accumulator tanks and hydraulic motor generators, linear or rotary water pumps with pressurized water storage and hydro-electric turbine generators.

The preceding descriptions and drawings of embodiments are provided to illustrate the broad inventive principles of the subject invention and are not intended to limit the invention to those specific details illustrated. Rather the claims are meant to cover common or obvious modifications not illustrated, but still within the spirit of the invention.

I claim:

1. A wave energy converting device comprising:
   at least one buoyant float having a wave impacting, forward face, wherein the face is oriented to receive wave fronts from a wave front receiving end, and wherein the length of the face is greater than the length of the float front-to-back depth measured independent of any float attachments, extensions or appendages;
   a buoyancy adjustable stabilized frame movably secured to the at least one float, wherein the frame has portions configured to receive and release seawater, wherein the seawater when received in the frame functions as ballast for the frame, and wherein the frame is configured to be at least partially submerged;
   a device anchor attached to the frame at at least one point, directly or with a mooring line, wherein the device anchor is selected from the group consisting of the sea bed, ballast, drag planes, drag plates, seabed affixed anchor lines, off-shore towers, off-shore platforms, seawalls, breakwaters, shorelines and combinations thereof;
   at least one mechanical linkage movably securing and defining the orientation and relative multi-axis motion of the at least one float to the frame, wherein the linkage is selected from the group consisting of roller tracks, slides, linear or hydrostatic bearings, lever arms and combinations thereof; and,
   a power take-off apparatus secured at least to the frame and configured to be driven by at least one force generated by the relative motion of the at least one float to the frame.

2. The device of claim 1 wherein the float has portions defining at least one cavity configured to receive and release seawater.

3. The device of claim 1 further comprising pressurized air blown water ballast tanks secured on or in the frame.

4. The device of claim 2 wherein the at least one cavity is configured as an open cavity with at least one concave, upwardly facing surface or with a closed cavity with portions defining water receiving and draining apertures.

5. The device of claim 4 wherein the apertures include mechanically controlled drains.

6. The device of claim 1 further comprising a sloped shoal plate having either a flat or curvilinear cross-sectional shape, wherein the shoal plate is secured to the frame in front of and below the at least one float forward face.

7. The device of claim 6 further comprising substantially vertically oriented converging side barriers secured to the shoal plate.

8. The device of claim 1 wherein the at least one float forward face is concave.

9. The device of claim 1 further comprising a sloped extension plate secured to, or integral with, the forward face and extending from a bottom of the forward face, or secured to, or integral with, a bottom of the at least one float and wherein the orientation of the extension plate is substantially the same angle defined by the mechanical linkage.

10. The device of claim 1 wherein the forward face comprises a hinged, spring loaded panel configured to rotate from a hinged pivot point rearwardly from the wave receiving end.

11. The device of claim 1 wherein the buoyant frame further comprises at least one fore or aft ballast tank.

12. The device of claim 1 wherein the buoyant frame further comprises a plurality of fore and aft ballast tanks to adjust the slope or pitch angle of the frame.

13. The device of claim 1 further comprising at least one sensor configured to sense the characteristics of oncoming sea waves and a controller to control the power takeoff force of the at least one float and frame and to control the spatial orientation of the combination frame and at least float relative to the direction of oncoming waves.

14. The device of claim 1 wherein the at least one float forward face is substantially linear in a horizontal plane.

15. The device of claim 1 wherein the at least one float forward face is substantially convex and arcuate in a horizontal plane relative to oncoming wave fronts.

16. The device of claim 1 further comprising a supplemental float forward return mechanism selected from the group consisting of electrical, hydraulic, pneumatic, mechanical, water ballast, gravity weights and combinations thereof.

17. The device of claim 1 wherein mooring lines secured to the frame are secured to at least one point forward of the at least one float and above the lowermost segment of the frame.

18. The device of claim 1 wherein the frame comprises at least one substantially vertical member having portions configured to extend above a mean water line when positioned in a body of water.

19. The device of claim 1 wherein the float defines a buoyant, upwardly concave cavity rotatable about its base.

20. The device of claim 1 further comprising at least one motion stabilizing drag plate including a spring loaded hinge joint secured to the frame, wherein the drag plate is configured to rotate about the hinged joint to accommodate extreme force waves.

21. The device of claim 1 wherein the float comprises an upwardly facing cavity defined by a forward, upwardly sloped wave impacting front wall, and a rearwardly sloped buoyant rear/bottom wall, wherein the walls converge at, or in close proximity to, a lower central pivot point to form a concave rotatable and pitchable buoyant vessel configured to receive seawater.

22. The device of claim 21 further comprising a carriage movably secured to the frame, wherein the pivot point is formed on the carriage.

23. The device of claim 22 further comprising a second power take-off apparatus secured at least to the frame.

24. The device of claim 1 wherein the buoyant frame has portions defining at least one water surface accessible, water tight air filled chamber, wherein the chamber contains the at least one power take-off apparatus.

25. The device of claim 24 further comprising gears secured to the frame and float to provide controlled movement of the float relative to the frame and further comprising power conditioning equipment and controls.

26. The device of claim 1 wherein the float comprises a single enclosed or upwardly open cavity defined by a fixed bottom, spring loaded, hinged, forward and upwardly facing non-buoyant forward face and a rearward and upwardly facing buoyant rear wall.

27. The device of claim 1 wherein the frame comprises stabilizing elements selected from the group consisting of fixed high-density ballast, water ballast, drag or heave plates, drag or heave planes, shoal planes and combinations thereof.

28. The device of claim 1 wherein the multi-axis movement includes upwardly and rearward movement and downwardly and forward movement relative to the direction of oncoming wave fronts.

\* \* \* \* \*